(12) United States Patent
Barako et al.

(10) Patent No.: US 11,808,526 B2
(45) Date of Patent: Nov. 7, 2023

(54) PRESSURE-COMPENSATED THERMAL ENERGY STORAGE MODULE

(71) Applicant: NORTHROP GRUMMAN SYSTEMS CORPORATION, Falls Church, VA (US)

(72) Inventors: Michael T. Barako, Redondo Beach, CA (US); Juan C. Garcia, Redondo Beach, CA (US); Jack S Rechtin, Los Angeles, CA (US); Nadine Y. Kawabata, Redondo Beach, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 219 days.

(21) Appl. No.: 17/313,536

(22) Filed: May 6, 2021

(65) Prior Publication Data
US 2022/0357112 A1 Nov. 10, 2022

(51) Int. Cl.
*F28D 20/02* (2006.01)
*F28D 20/00* (2006.01)

(52) U.S. Cl.
CPC ...... *F28D 20/02* (2013.01); *F28D 2020/0004* (2013.01); *F28D 2020/0082* (2013.01); *F28D 2020/0091* (2013.01)

(58) Field of Classification Search
CPC ............. F28D 20/02; F28D 2020/0004; F28D 2020/0082; F28D 2020/0091
USPC ........................................... 165/104.17
See application file for complete search history.

(56) References Cited

U.S. PATENT DOCUMENTS

| 6,400,896 B1 * | 6/2002 | Longardner ............ F28D 20/02 126/400 |
| 2014/0331711 A1 * | 11/2014 | Blezard ..................... B65B 3/04 62/457.2 |
| 2019/0316851 A1 | 10/2019 | Bissell et al. |
| 2021/0310750 A1 * | 10/2021 | Zaglio ..................... F28D 20/02 |

FOREIGN PATENT DOCUMENTS

| CN | 108708836 A | * 10/2018 |
| DE | 2828902 A1 | 1/1980 |
| DE | 3125463 A1 | 1/1983 |
| JP | 2017504791 A | 2/2017 |
| WO | 2020065353 A1 | 4/2020 |

* cited by examiner

*Primary Examiner* — Jon T. Schermerhorn, Jr.
(74) *Attorney, Agent, or Firm* — Shumaker, Loop & Kendrick, LLP; John A. Miller

(57) ABSTRACT

A thermal energy storage system including an enclosure having an internal volume. An incompressible phase change material (PCM) is provided within the internal volume of the enclosure, where the PCM contracts into a solid state when its temperature falls below a certain temperature and expands into a liquid state when its temperature goes above the certain temperature. An elastic bladder is positioned adjacent to the PCM within the internal volume of the enclosure and is filled with a compressible material, where the PCM pushes against the bladder when it is expanded to the liquid state and causes the compressible material to be compressed within the bladder and the enclosure.

20 Claims, 2 Drawing Sheets

PRESSURE-COMPENSATED THERMAL ENERGY STORAGE MODULE

BACKGROUND

Field

This disclosure relates generally to a thermal energy storage module and, more particularly, to a thermal energy storage module including a sealed enclosure enclosing an incompressible phase change material (PCM) and a compressible material contained in an elastic bladder.

Discussion of the Related Art

Thermal energy storage systems, sometimes referred to as thermal batteries, are systems or devices that can store thermal energy for use at a later time. Thermal energy storage systems typically employ an incompressible phase change material (PCM), i.e., a material, such as a suitable wax, that releases or absorbs heat at a phase transition of the material, such as between a solid and a liquid. More specifically, the PCM melts from a solid to a liquid when its temperature goes above a certain temperature, and thus absorbs heat, and solidifies from a liquid to a solid when its temperature goes below the certain temperature and thus releases heat. The ability of thermal energy storage systems to absorb and release heat in this manner makes them attractive for buffering temperature changes in a dynamic system in order maintain the dynamic system at some controlled constant temperature.

When a PCM undergoes a phase transition between a liquid and solid state there is a significant change in the volume of the material as a result of the densities of the solid and liquid phases. Therefore, when a PCM is heated and undergoes a change from a solid to a liquid, the material expands in the space in which it is contained. If the space is a sealed vessel of constant volume and the PCM fills the vessel when it is in the solid state, the vessel becomes pressurized when it is heated and the PCM is converted to the liquid phase, which could cause leakage, rupture or catastrophic failure of the thermal energy storage system. For example, a large increase in pressure can push liquid-phase PCMs through seams, interfaces, O-rings, fittings and other pathways that may cause leakage. If the space is a sealed vessel of constant volume and the PCM fills the vessel when it is in the liquid state, then the PCM does not make sufficient thermal contact with the vessel when it is cooled and contracts into a solid phase. This makes the use of thermal energy storage systems undesirable for certain applications, such as aerospace applications, because of the risk associated with pressurizing a vessel.

DETAILED DESCRIPTION OF THE EMBODIMENTS

The following discussion of the embodiments of the disclosure directed to a thermal energy storage module including a sealed enclosure enclosing an incompressible phase change material (PCM) and a compressible material contained in an elastic bladder is merely exemplary in nature, and is in no way intended to limit the disclosure or its applications or uses.

As will be discussed in detail below, this disclosure proposes a thermal energy storage system that employs a combination of an incompressible PCM and a compressible material, such as an inert gas, within a sealed enclosure, which allows the PCM to expand and compress a volume of the compressible material without significantly increasing the pressure on the enclosure.

Figure 1:
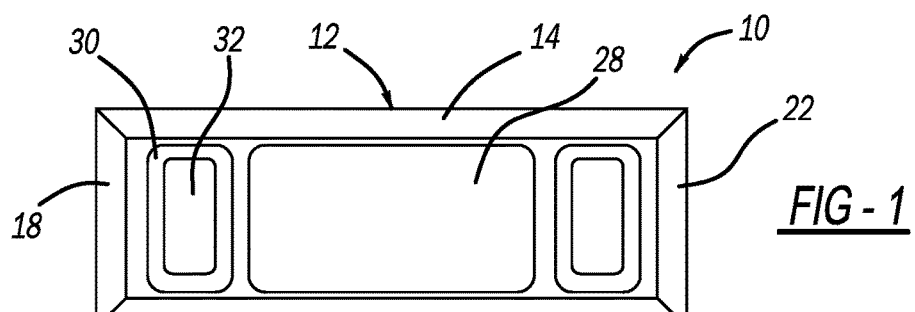
FIG. 1 is a cross-sectional type side view of a thermal energy storage module showing a PCM in a contracted solid phase.
Figure 2:
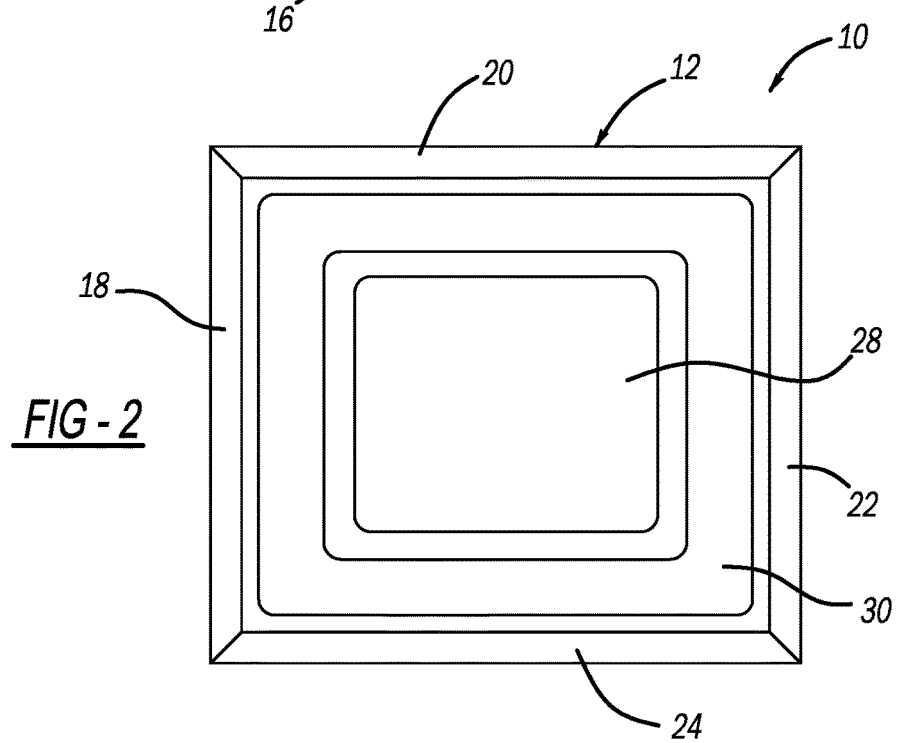
FIG. 2 is a cross-sectional type top view of the thermal energy storage module shown in FIG. 1.

FIG. 1 is a cross-sectional type side view and FIG. 2 is cross-sectional type top view of a thermal energy storage module 10 including a sealed enclosure 12 having a top wall 14, a bottom wall 16 and side walls 18, 20, 22 and 24. It is notes that the shape of the enclosure 12 is merely for illustrative purposes in that other shapes may be equally applicable. The module 10 also includes a mass of a PCM 28 positioned at a center location of the enclosure 12 that is any suitable incompressible material, such as wax, that releases and absorbs heat when it incurs a phase change between a solid phase and a liquid phase, where the PCM 28 can have any suitable shape. The enclosure 12 may enclose a series of fins (not shown) that the PCM 28 is formed around to provide better thermal transfer. An annular elastomer bladder 30 is positioned around the PCM 28 between the top and bottom walls 14 and 16 and adjacent to the side walls 18, 20, 22 and 24. The bladder 30 is filled with a compressible material 32, such as an inert gas, for example, nitrogen or argon. Although space is shown between the PCM 28 and the top and bottom walls 14 and 16, between the PCM 28 and the bladder 30 and between the bladder 30 and the top wall 14, the bottom wall 16 and the side walls 18, 20, 22 and 24, these spaces would not be present in an efficient working system for increased thermal transfer.

Figure 3:
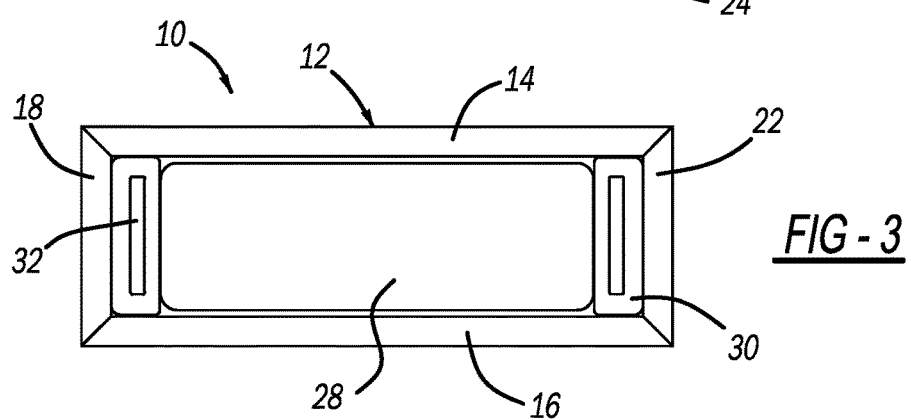
FIG. 3 is a cross-sectional type side view of the thermal energy storage module shown in FIG. 1 showing the PCM in an expanded liquid phase.

FIGS. 1 and 2 show the PCM 28 in the solid phase where it is contracted. FIG. 3 is a cross-sectional type side view of the module 10 showing the PCM 28 in the liquid phase where it is expanded. As the PCM 28 expands from its solid state to its liquid state it pushes against the bladder 30 causing the material 32 to be compressed in the bladder 30 and the internal volume of the bladder 30 to be reduced. The bladder 30 pushes against the top wall 14, the bottom wall 16 and the side walls 18, 20, 22 and 24 of the enclosure 12, but because the material 32 is compressible the pressing force is not significant. Further, the elastic properties of the bladder 30 cause it to fill in open spaces and seams to provide increased sealing of the enclosure 12.

Figure 4:
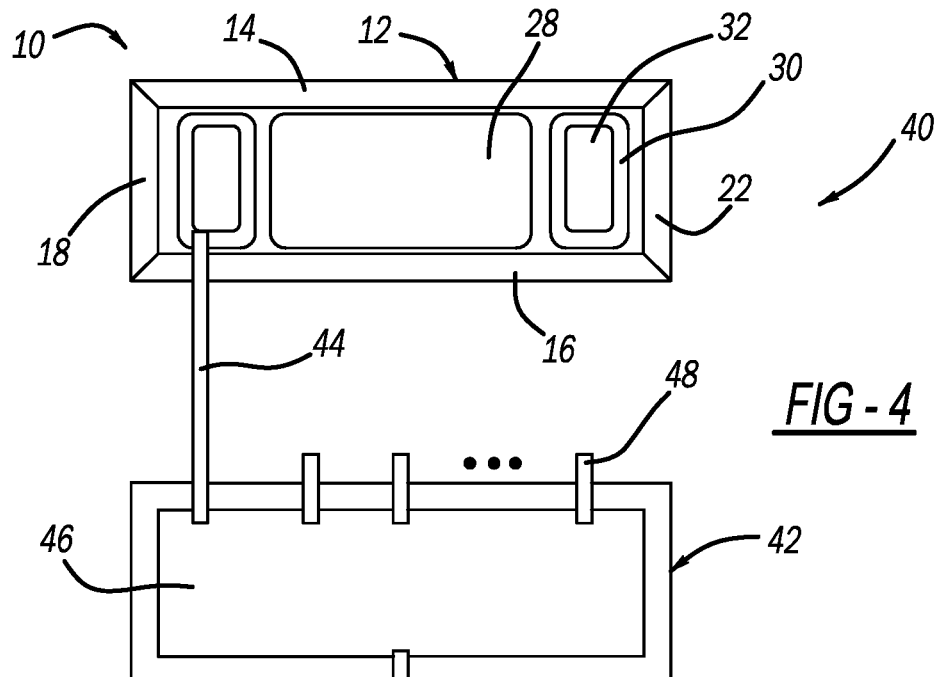
FIG. 4 is an illustration of a thermal energy storage system including the thermal energy storage module shown in FIG. 1.

The thermal energy storage module 10 can be combined with an external reservoir to increased pressure control. FIG. 4 is an illustration of a thermal energy storage system 40 including the module 10 illustrating this feature. The inside of the bladder 30 is in fluid communication with a reservoir 42 through a gas transfer line 44, where the reservoir 42 stores a large volume 46 of the material 32. The pressure within the reservoir 42 can be set to some value based on the amount of the material 32 in the system 40 and the volume of the bladder 30, the reservoir 42 and the line 44. When the PCM 28 is heated and changes phase from a solid to a liquid, the bladder 30 is compressed by the expansion of the PCM 28, which causes the material 32 to flow from the bladder 30 into the reservoir 42 through the line 44 and increase the pressure in the reservoir 42 by an amount proportional to the total compressible volume in the bladder 30, the reservoir 42 and the line 44. When the PCM 28 is cooled and changes phase from a liquid to a solid the pressure within the reservoir 42 causes the bladder 30 to be inflated with the compressible material 32 from the reservoir 42 and cause the bladder 30 to fill in the volume between the PCM 28 and the top wall 14, the bottom wall 16 and the side walls 18, 20, 22 and 24. Therefore, a compression ratio of the PCM 28 can be selected based on the total volume of the displaced material 32 in the bladder 30 and the total volume of the reservoir 42 and the line 44.

A pressure relief manifold 50 can also be provided for over pressure and under pressure protection. The manifold 50 is in fluid communication with the reservoir 42 through a pressure relief line 52, which allows the material 32 to flow into the manifold 50 and be at the same pressure as in the reservoir 42. The manifold 50 includes an over pressure check valve 54 that allows the material 32 to escape from the system 40 if the pressure in the reservoir 42 gets too high and an under pressure check valve 56 that allows the material 32 to enter the system 40 if the pressure in the reservoir 42 gets too low.

A number of inlet/outlet ports 48 are in fluid communication with the reservoir 42 and can be coupled to bladders in a number of other thermal energy storage modules (not show) of the same or a similar design to the module 10. Therefore, multiple thermal energy storage modules can be used to control the temperature of a device or system using a common external reservoir.

Figure 5:
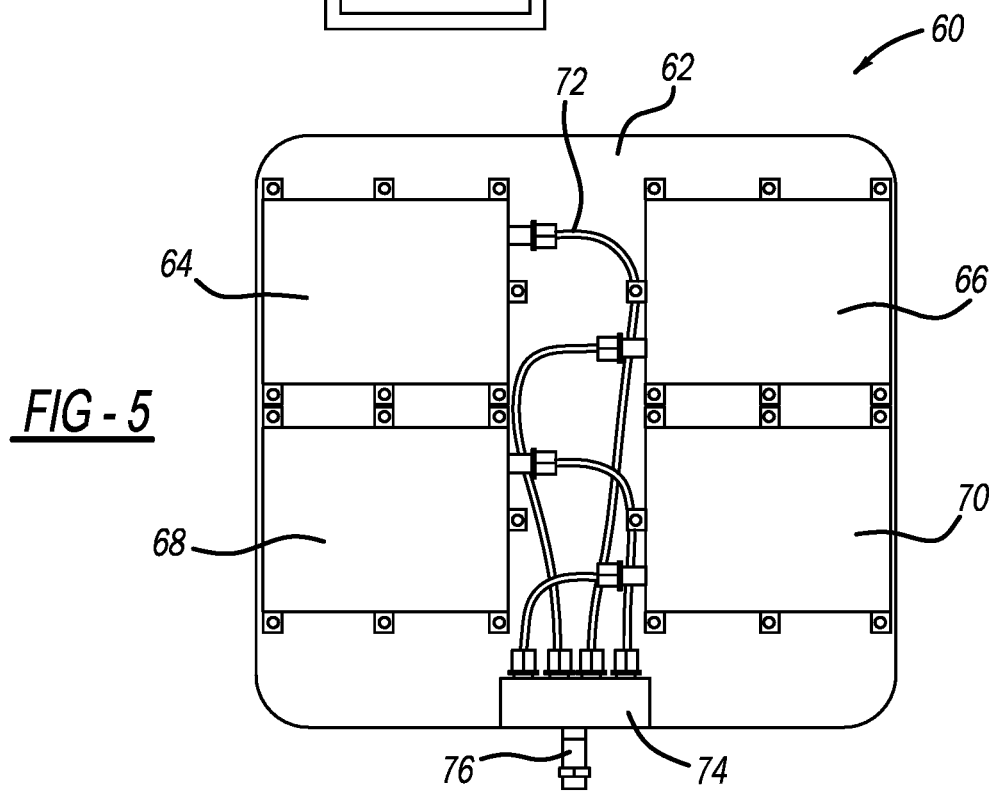
FIG. 5 is a top view of a thermal energy storage system including four thermal energy storage modules controlling the temperature of a device.

FIG. 5 is a top view of a thermal system 60 including a device 62, such as an electronic circuit, whose temperature is being controlled to a constant temperature by four thermal energy storage modules 64, 66, 68 and 70 of the type discussed above to illustrate this embodiment. The bladders (not shown) within the modules 64, 66, 68 and 70 are in fluid communication with a reservoir (not shown) through tubes 72, a manifold 74 and an inlet/outlet port 76 to provide the pressure control as discussed above.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A thermal energy storage system comprising:
an enclosure including an internal volume;
an incompressible phase change material (PCM) provided within the internal volume of the enclosure, said PCM contracting into a solid state when its temperature falls below a certain temperature and expanding into a liquid state when its temperature goes above the certain temperature; and
an annular elastic bladder completely positioned around the PCM within the internal volume of the enclosure and being filled with a compressible material, wherein the PCM pushes against the bladder when it is expanded to the liquid state, which causes the compressible material to be compressed within the bladder and push the bladder against the enclosure.

2. The system according to claim 1 wherein the compressible material is an inert gas.

3. The system according to claim 1 wherein the enclosure is a sealed enclosure.

4. The system according to claim 3 wherein the bladder forms into spaces and seams within the internal volume in response to being pushed by the PCM.

5. The system according to claim 1 further comprising a reservoir containing a volume of the compressible material, wherein the compressible material in the bladder is in fluid communication with the compressible material in the reservoir.

6. The system according to claim 5 wherein the enclosure containing the PCM and the bladder is one thermal energy storage module, said system further comprising a plurality of thermal energy storage modules each including an enclosure containing a PCM and bladder and each being in fluid communication with the reservoir.

7. The system according to claim 1 further comprising a pressure relief manifold in fluid communication with the reservoir.

8. The system according to claim 7 wherein the pressure relief manifold includes an over pressure check valve.

9. The system according to claim 7 wherein the pressure relief manifold includes an under pressure check valve.

10. The system according to claim 1 wherein the enclosure includes a top wall, a bottom wall and four side walls, and wherein the bladder pushes against the top wall, the bottom wall and the four side walls of the enclosure when it is pushed by the PCM.

11. A thermal energy storage system comprising:
at least one thermal energy storage module including an enclosure having an internal volume, an incompressible phase change material (PCM) provided within the internal volume of the enclosure, said PCM contracting into a solid state when its temperature falls below a certain temperature and expanding into a liquid state when its temperature goes above the certain temperature, and an annular elastic bladder completely positioned around the PCM within the internal volume of the enclosure and being filled with a compressible material, wherein the PCM pushes against the bladder when it is expanded to the liquid state, which causes the compressible material to be compressed within the bladder and push the bladder against the enclosure; and
a reservoir containing a volume of the compressible material, wherein the compressible material in the bladder is in fluid communication with the compressible material in the reservoir.

12. The system according to claim 11 wherein the at least one thermal energy storage module is a plurality of thermal energy storage modules each including an enclosure, an incompressible PCM and an elastic bladder filled with the compressible material, wherein the elastic bladder in each of the thermal energy storage modules is in fluid communication with the reservoir.

13. The system according to claim 11 further comprising a pressure relief manifold in fluid communication with the reservoir, said pressure relief manifold including an over pressure check valve and/or an under pressure check valve.

14. The system according to claim 11 wherein the compressible material is an inert gas.

15. The system according to claim 11 wherein the enclosure is a sealed enclosure.

16. The system according to claim 15 wherein the bladder forms into spaces and seams within the internal volume in response to being pushed by the PCM.

17. The system according to claim 11 wherein the enclosure includes a top wall, a bottom wall and four side walls, and wherein the bladder pushes against the top wall, the bottom wall and the four side walls of the enclosure when it is pushed by the PCM.

18. A thermal energy storage module comprising:
a sealed enclosure including an internal volume;
an incompressible phase change material (PCM) provided within the internal volume of the enclosure, said PCM contracting into a solid state when its temperature falls below a certain temperature and expanding into a liquid state when its temperature goes above the certain temperature; and
an annular elastic bladder surrounding and completely positioned around the PCM within the internal volume of the enclosure and being filled with a compressible inert gas, wherein the PCM pushes against the bladder when it is expanded to the liquid state, which causes the compressible material to be compressed within the bladder and push the bladder against the enclosure.

19. The module according to claim 18 wherein the bladder forms into spaces and seams within the internal volume in response to being pushed by the PCM.

20. The module according to claim 18 wherein the enclosure includes a top wall, a bottom wall and four side walls, and wherein the bladder pushes against the top wall, the bottom wall and the four side walls of the enclosure when it is pushed by the PCM.

\* \* \* \* \*